US009703387B2

(12) United States Patent
Nayak et al.

(10) Patent No.: US 9,703,387 B2
(45) Date of Patent: Jul. 11, 2017

(54) SYSTEM AND METHOD OF REAL-TIME INTERACTIVE OPERATION OF USER INTERFACE

(71) Applicant: KONICA MINOLTA LABORATORY U.S.A., INC., San Mateo, CA (US)

(72) Inventors: Nandita M. Nayak, Santa Clara, CA (US); Ghassem Tofighi, Belmont, CA (US); Haisong Gu, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/840,596

(22) Filed: Aug. 31, 2015

(65) Prior Publication Data

US 2017/0060250 A1    Mar. 2, 2017

(51) Int. Cl.
| G09G 5/00 | (2006.01) |
| G06F 3/01 | (2006.01) |
| G06F 3/03 | (2006.01) |
| G06F 3/0484 | (2013.01) |
| G06F 3/042 | (2006.01) |
| G06K 9/00 | (2006.01) |

(52) U.S. Cl.
CPC ............ *G06F 3/017* (2013.01); *G06F 3/0304* (2013.01); *G06F 3/0425* (2013.01); *G06F 3/04842* (2013.01); *G06F 3/04845* (2013.01); *G06K 9/00342* (2013.01); *G06K 9/00355* (2013.01)

(58) Field of Classification Search
CPC ...................................................... G06F 3/017
USPC ....................................................... 345/156
See application file for complete search history.

(56) References Cited

U.S. PATENT DOCUMENTS

| 6,147,678 A * | 11/2000 | Kumar ................. G06F 3/017 |
| | | 345/156 |
| 8,933,876 B2 | 1/2015 | Galor et al. |
| 8,971,572 B1 * | 3/2015 | Yin .................... G06K 9/00355 |
| | | 345/173 |

(Continued)

FOREIGN PATENT DOCUMENTS

WO    2015008164 A2    1/2015

OTHER PUBLICATIONS

Jing P. et al., "Human-computer Interaction using Pointing Gesture based on an Adaptive Virtual Touch Screen", International Journal of Signal Processing, Image Processing and Pattern Recognition, vol. 6, No. 4, Aug. 2013, (pp. 81-92).

(Continued)

*Primary Examiner* — Jason Olson
(74) *Attorney, Agent, or Firm* — Buchanan Ingersoll & Rooney PC (57) ABSTRACT

A method, a system, and a non-transitory computer readable medium are disclosed for real-time interaction with a user interface recognizing a gesture. The method including capturing three-dimensional (3D) data on a subject; detecting a pointing action by the subject from the 3D data; computing an initial estimate of a target region from the pointing action, the initial estimate of the target region having a defined radius around a center point; and tracking the pointing action of the subject and performing a series of iterations wherein the defined radius of the target region changes based on the detected pointing action.

23 Claims, 10 Drawing Sheets

(56) References Cited

U.S. PATENT DOCUMENTS

| | | | |
|---|---|---|---|
| 2001/0028341 A1* | 10/2001 | Kitazawa | G06F 3/0425 345/156 |
| 2004/0151218 A1* | 8/2004 | Branzoi | G06F 3/0386 372/25 |
| 2010/0138785 A1 | 6/2010 | Uoi et al. | |
| 2011/0262002 A1* | 10/2011 | Lee | G06F 3/017 382/103 |
| 2013/0044053 A1 | 2/2013 | Galor et al. | |
| 2013/0177204 A1* | 7/2013 | Yun | G06K 9/00355 382/103 |
| 2013/0191790 A1 | 7/2013 | Kawalkar | |
| 2013/0318453 A1 | 11/2013 | Jeong et al. | |
| 2013/0321271 A1 | 12/2013 | Bychkov et al. | |
| 2014/0055483 A1 | 2/2014 | Pance et al. | |
| 2015/0062010 A1* | 3/2015 | Lin | G06K 9/00389 345/157 |
| 2015/0262269 A1 | 9/2015 | Zamer | |

OTHER PUBLICATIONS

Extended European Search Report issued Jan. 11, 2017, by the European Patent Office in corresponding European Patent Application No. 16177179.5 (11 pages).

* cited by examiner

SYSTEM AND METHOD OF REAL-TIME INTERACTIVE OPERATION OF USER INTERFACE

FIELD OF THE INVENTION

The present disclosure relates to a system and method of real-time interactive operation of user interface, and more particularly, a system and method which recognizes a pointing operation, accounts for a position of the user with respect to a screen and tracks the hand position of the user to be used as feedback to accurately identify a location or a target on the screen being pointed to by the user.

BACKGROUND OF THE INVENTION

The operation of a gesture-based user interface from a distance can be a challenging task. For example, the user is often unable to point at the exact location or target on the screen in which he or she intends to point due to parallax error. Existing systems also have technological limitations for accurate pointing recognition.

Currently, there are few systems that can allow users to operate a user interface using gestures from a distance greater than, for example, about 3 meters, and which can interactively obtain feedback from the user to increase accuracy of pointing and which use the potential target locations to guide the user for fast and accurate pointing.

SUMMARY OF THE INVENTION

In consideration of the above issues, it would be desirable to have a method and system, which recognizes a pointing operation, accounts for the position of the user with respect to the screen and tracks the hand position of the user to be used as feedback to accurately identify the location or target on the screen pointed by the user.

In accordance with an exemplary embodiment, a method is disclosed of recognizing gestures for real-time interaction with a user interface, comprising: capturing three-dimensional (3D) data on a subject; detecting a pointing action by the subject from the 3D data; computing an initial estimate of a target region from the pointing action, the initial estimate of the target region having a defined radius around a center point; and tracking the pointing action of the subject and performing a series of iterations wherein the defined radius of the target region changes based on the detected pointing action.

In accordance with an exemplary embodiment, a system is disclosed for recognizing gestures for real-time interaction with a user interface, comprising: a motion and depth sensor for capturing three-dimensional (3D) data on a subject; and a processor configured to: capture three-dimensional (3D) data on a subject; detect a pointing action by the subject from the 3D data; compute an initial estimate of a target region from the pointing action, the initial estimate of the target region having a defined radius around a center point; and track the pointing action of the subject and performing a series of iterations wherein the defined radius of the target region changes based on the detected pointing action.

In accordance with an exemplary embodiment, a non-transitory computer readable medium containing a computer program storing computer readable code for recognizing gestures for real-time interaction with a user interface is disclosed, the program being executable by a computer to cause the computer to perform a process comprising: capturing three-dimensional (3D) data on a subject; detecting a pointing action by the subject from the 3D data; computing an initial estimate of a target region from the pointing action, the initial estimate of the target region having a defined radius around a center point; and tracking the pointing action of the subject and performing a series of iterations wherein the defined radius of the target region changes based on the detected pointing action.

In accordance with an exemplary embodiment, a method is disclosed of recognizing gestures for real-time interaction with a user interface, comprising: capturing three-dimensional (3D) data on a subject; detecting a pointing action by the subject from the 3D data to begin a pointing operation; determining a point of intersection of the pointing action on an actual screen; determining if one or more targets on the actual screen are within a defined radius around a computed point on the actual screen; and if at least one target is present, determining if a number of targets is equal to one or greater than one, and wherein if the number of targets is equal to one, selecting a target, and if the number of targets is greater than one, reducing the defined radius to reduce the number of targets within the defined radius until a single target remains.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Figure 1:
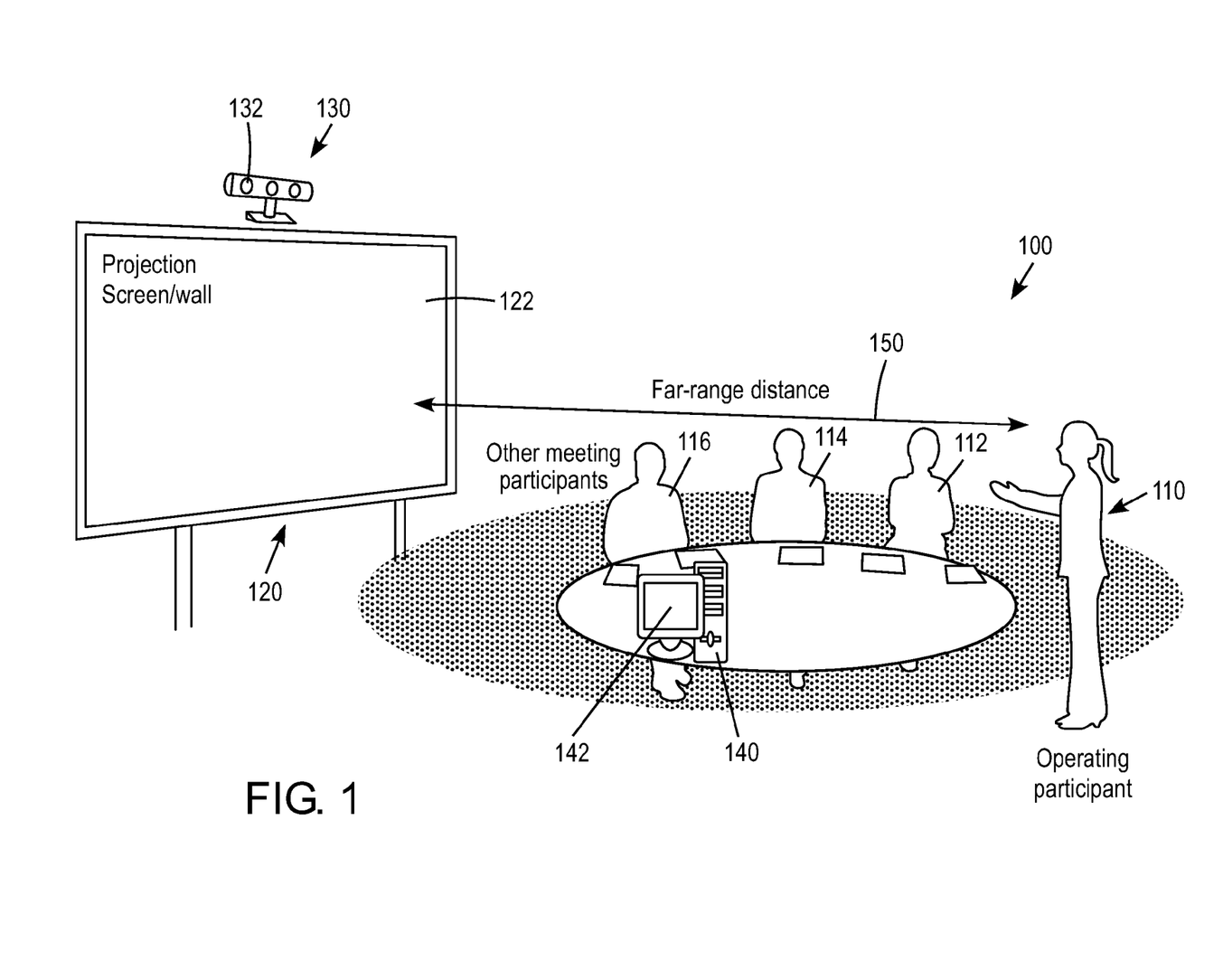
FIG. 1 is an illustration showing a scenario for real-time interactive operation of user interface in accordance with an exemplary embodiment.
Figure 2:
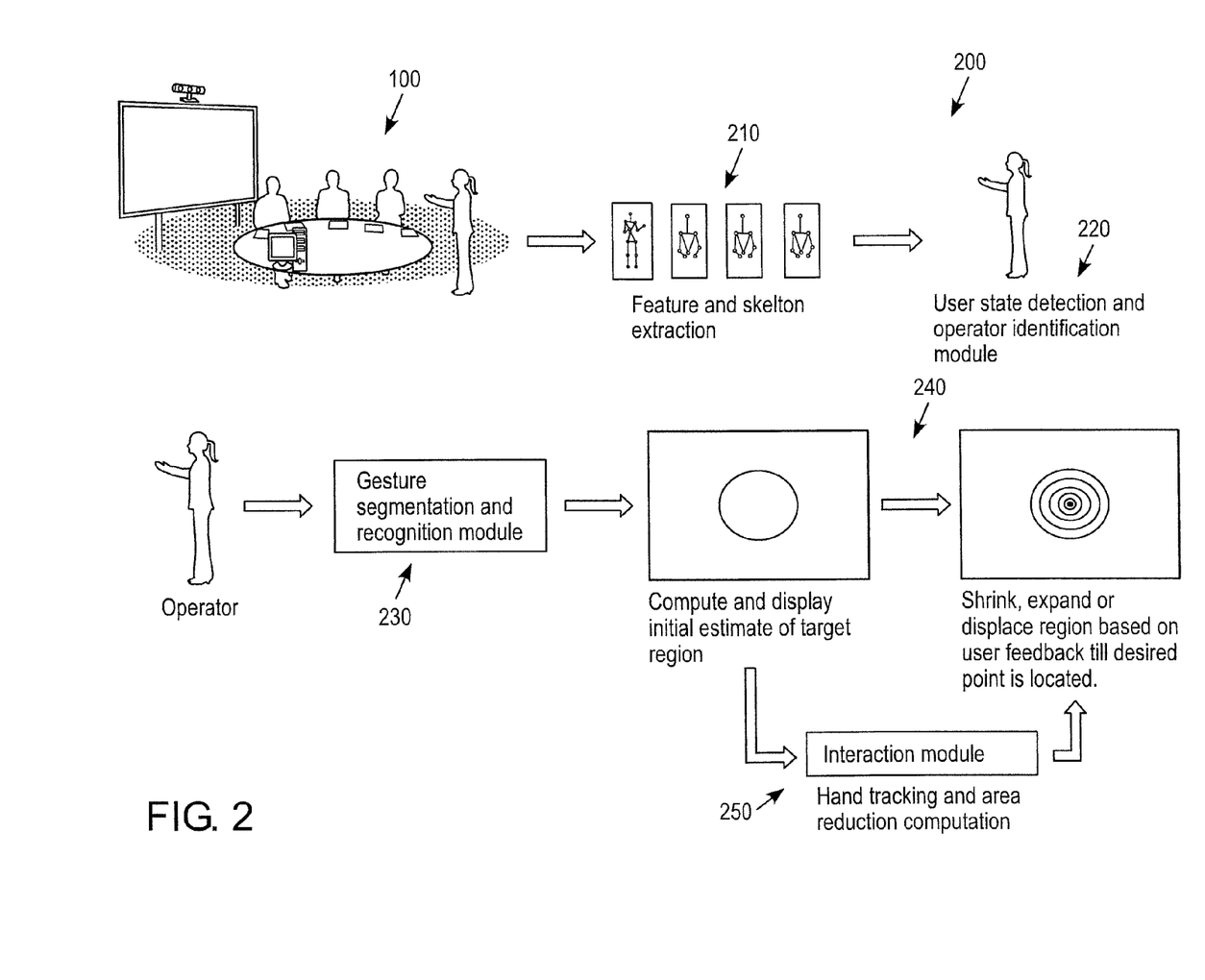
FIG. 2 is an illustration showing an overview of an exemplary user interface system for a meeting scenario in accordance with an exemplary embodiment.

In applications involving multi-person information sharing such as in a conference 100, or in the gesture-based operation of a user interface 120, such as a large screen or monitor 122, enabling a user 110 to operate from a distance 150, for example, of greater than 3 meters, can be very useful and intuitive. An illustration of the exemplary scenario is shown in FIG. 1. Using the location of the potential targets on the screen or monitor 122 to direct the search and obtaining real-time gesture-based feedback from the user 110 to locate the object can help overcome these challenges. In addition, by mapping the distance and angle of the user 110 with respect to the screen 122, one can enable multiple users 112, 114, 116 standing in different positions to operate the user interface (UI) 120 as shown in FIG. 200.

As shown in FIG. 1, the conference (or conference room) 100 can include a user interface 120, which can be, for example, a projection (i.e., an actual screen) for displaying a projected image onto a wall or screen, a television screen, a touch screen, video monitor, and/or a video screen 122. The conference or conference room 100 can also include, for example, one or more data input devices 130, which can include a motion and/or depth sensor camera 132. The motion and/or depth sensor camera 132 can be, for example, a RGB-D camera having, for example, Red, Green, Blue color space with a depth or distance capability, which can be used for acquiring color images (RGB color space) and a depth or distance of a subject or user 110, 112, 114, 116 in each of the images. More preferably, for example, the motion and/or depth sensor camera 132 is a motion and depth sensor camera that can capture the depth and/or distance of the subject or user 110, 112, 114, 116 in each of the images.

In accordance with an exemplary embodiment, each of the one or more data input devices 130 can include a memory, a processor, an operating system, and one or more software applications for executing a process or an algorithm for each of the modules 210, 220, 230, 240, 250 (FIG. 2) as disclosed herein.

In addition, in accordance with an exemplary embodiment, the conference room can include a computer or processing device 140 having a memory, a processor, an operating system, one or more software applications for executing a process or an algorithm for each of the modules 210, 220, 230, 240, 250 (FIG. 2) as disclosed herein. The computer or processing device 140 can include a display or graphical user interface (GUI) 142. It can be appreciated that the display 142 can be part of a standalone computer, or can be contained within one or more computer or processing devices.

In accordance with an exemplary embodiment, the one or more data input devices 130 can be connected to the computer or processing device 140 via an Internet or network connection, such as a LAN (Local Area Network) or WAN (Wide Area Network), and/or wireless technology including but not limited to radio frequency (RF), Bluetooth® and/or infrared (IR) transmission.

FIG. 2 is a pictorial view of the system 200 applied for user interface operation in a conference or meeting scenario. For example, a meeting could consist of multiple participants 110, 112, 114, 116, either of whom would be the operator 110 and the rest can be passive participants 112, 114, 116. In accordance with an exemplary embodiment, the components in the interactive user interface 120 can include a feature extraction module 210, operator identification module 220, gesture segmentation and recognition module 230, target region mapping and estimation module 240, and an interaction module 250, which performs hand tracking and can reduce the selected area based on a user's hand movement.

In accordance with an exemplary embodiment, the introduction of cost-effective depth sensors with the real-time skeleton extraction has generated interest in human gesture recognition. In accordance with an exemplary embodiment, for example, a stream of skeleton data from a motion and depth sensor 132 can be used as the input. In accordance with an exemplary embodiment, for example, the motion and depth sensor 132 can be installed at a known location where all users 110, 112, 114, 116 can be visible as shown in FIG. 1.

Figure 3:
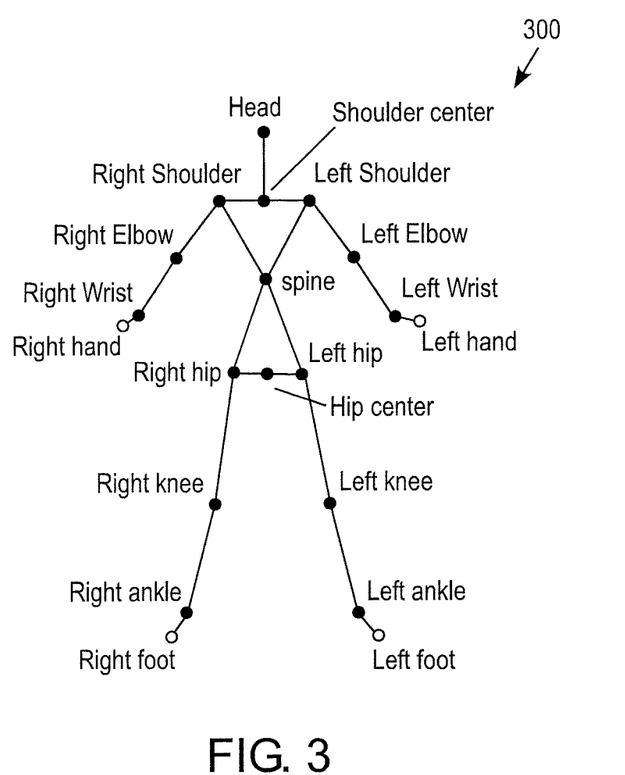
FIG. 3 shows three-dimensional ("3D") positions of the joints used for deriving features in accordance with an exemplary embodiment.

FIG. 3 is an illustration of skeletal joints 300 and corresponding three-dimensional (3D) positions, which can be used for deriving features in accordance with an exemplary embodiment. As shown in FIG. 3, preferably, the 3D positions of the major joints, for example, the 16 major joints in a human skeleton system can be detected using the depth camera and motion sensors 132. However, in accordance with an exemplary embodiment, not all are needed, and less than 16 joints can be used. For example, in accordance with an exemplary embodiment, only the joints of the right and left hip and above, for example, the upper torso and head can be used. In accordance with an exemplary embodiment, the joints of the legs can be considered redundant for hand gesture recognition.

Feature Extraction Module

Figure 4:
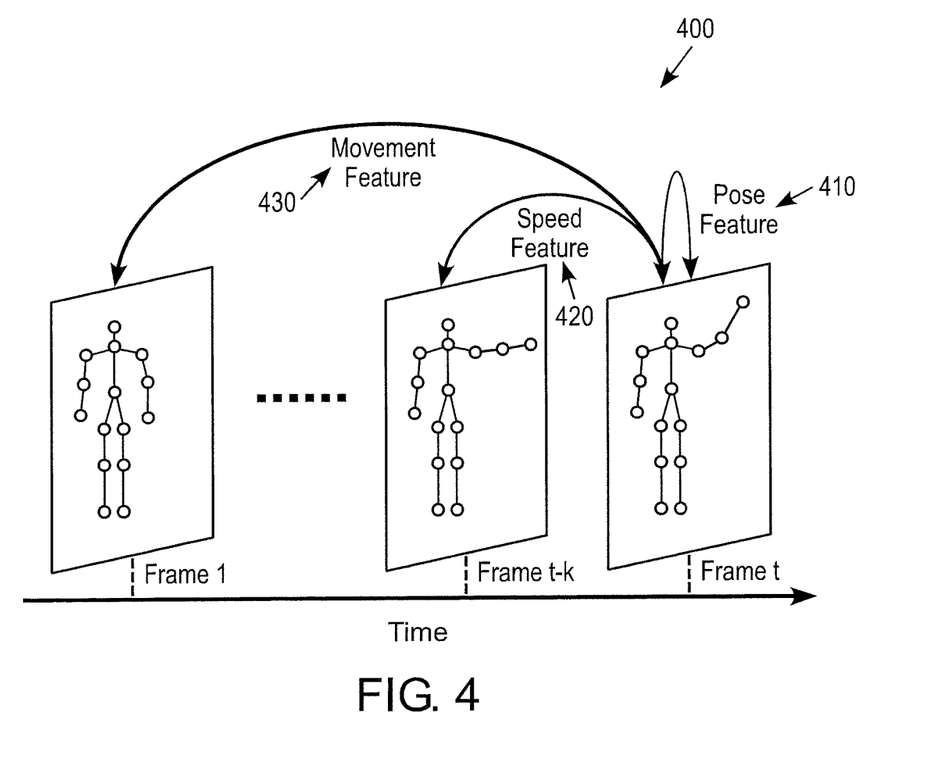
FIG. 4 shows features used in the system for gesture recognition in accordance with an exemplary embodiment.

In accordance with an exemplary embodiment, based on the skeleton data 300, the feature extraction module 210 can extract features 400 as shown in FIG. 4 for user state detection, operator identification, action segmentation, and recognition. An action video with T frames and N joints in each frame can be represented as a set of 3D points sequence, written as $v=\{x_n^t \in R^3 | n=1, \ldots, N; t=1, \ldots, T\}$. In accordance with an exemplary embodiment, in an exemplary system, N=15 and T varies for different sequences. The first step of feature extraction is to compute basic feature for each frame, which describes the pose, speed, and movement information of every joint in a single frame.

The pose feature $f_p(x_n^t)$ 410 describes the relative position between joint n and every other joint in frame t, written as $f_p(x_n^t)=\{x_n^t-x_i^t | i=1, \ldots, N; i \neq n; t=1, \ldots, T\}$. Therefore, for each of the N joints, there is a T-length sequence with (N−1) dimensional elements (subtraction results) in each frame. In accordance with an exemplary embodiment, the pose feature 410 captures the body posture in every frame.

The speed feature $f_s(x_n^t)$ 420 describes the relative position between joint n in frame t and every joint in a preceding frame (t-k), where k is the parameter of speed estimation step size. This parameter depends on the frame rate of recorded action video, and should be the minimum gap between frame (t-k) and frame t to show an obvious movement for a joint n if it has a significant activity during that period. Therefore, the speed feature is written as $f_s(x_n^t)=\{x_n^t-x_i^{t-k} | i=1, \ldots, N; t=k+1, \ldots, T; k>0\}$. As its name implies, the speed feature 420 provides the information how fast body moves in every frame.

The movement feature $f_m(x_n^t)$ 430 describes the relative position between joint n in frame t and every joint in the first frame, written as $f_m(x_n^t)=\{x_n^t-x_i^1 | i=1, \ldots, N; t=2, \ldots, T\}$. For a well-segmented or aligned action video, the starting frame is always supposed to be initially static. The movement feature 430 captures the body movement in every frame compared to the initial status. FIG. 4 shows the above-described three basic features, which includes the pose feature 410, the speed feature 420, and the movement feature 430.

In accordance with an exemplary embodiment, a concentric sphere bin representation of the features 410, 420, 430 can then be computed by transforming the features 410, 420, 430 to spherical coordinates. The final descriptor is the histogram of oriented gradients of these features.

User State Detection and Operator Identification Module

In a scenario where multiple people 110, 112, 114, 116 are within the field of view of the camera 132, at most one person is the operator and the other people are to be passive participants. The user state detection and operator identification module 220 can identify the state of the participant as active/idle. Using the skeleton information and the features extracted, the module 220 identifies persons who are in standing position. For example, in accordance with an exemplary embodiment, the person can raise a hand to be considered as the operator. Using the same procedure that is defined in the action segmentation and recognition module, the raise hand gesture is recognized. The person identified (ID) is marked as the operator 110 and the others are considered as passive participants 112, 114, 116 until some other person raises his or her hand.

Action Segmentation and Recognition Module

Figure 5:
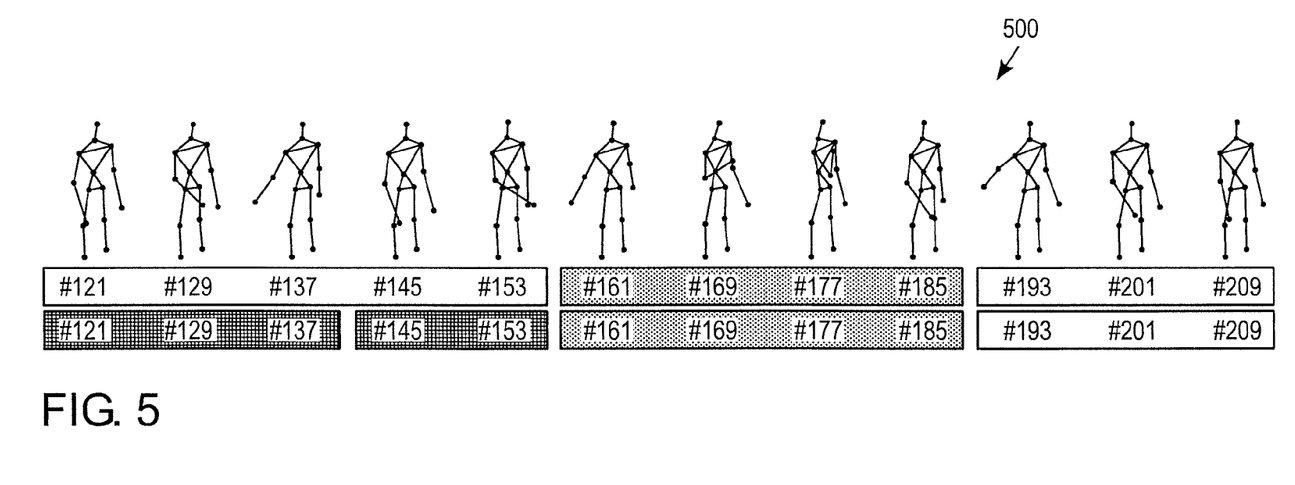
FIG. 5 shows an example of segmenting a series of frames into different gestures marked in different colors and/or backgrounds in accordance with an exemplary embodiment.

In accordance with an exemplary embodiment, in a system where continuous actions are taking place over a long period of time, it can be necessary to identify (or segment out) the different meaningful actions, ignore meaningless actions, and perform the required task for each of the meaningful actions. In accordance with an exemplary embodiment, these tasks can be performed by the action segmentation and recognition module (or gesture segmentation and recognition module) 230. FIG. 5 shows an illustration of a series of frames 500 divided into different gestures marked in different colors (or backgrounds).

The action segmentation can consist of three steps: the first step can apply a Maximum Mean Discrepancy (MMD) criterion to detect the change-points over continuous gestures as the initial estimated cuts of the gesture transitions; the second step uses kinematic constraints to revise an initial estimated cut to an accurate gesture transition position; and finally, a third step, a probability density estimation can be used to estimate the hand motion between two cuts to eliminate unintentional movements and non-gesture segments.

Once the segmentation is performed, the meaningful gestures can be recognized. In accordance with an exemplary embodiment, a training set consisting of several actors performing the same set of meaningful gestures can be used to extract features and train a support vector machine (SVM classifier). The features from the extracted segments can then be fed to the SVM for recognizing actions.

Initial Region Estimation on the Screen for Pointing

Figure 6:
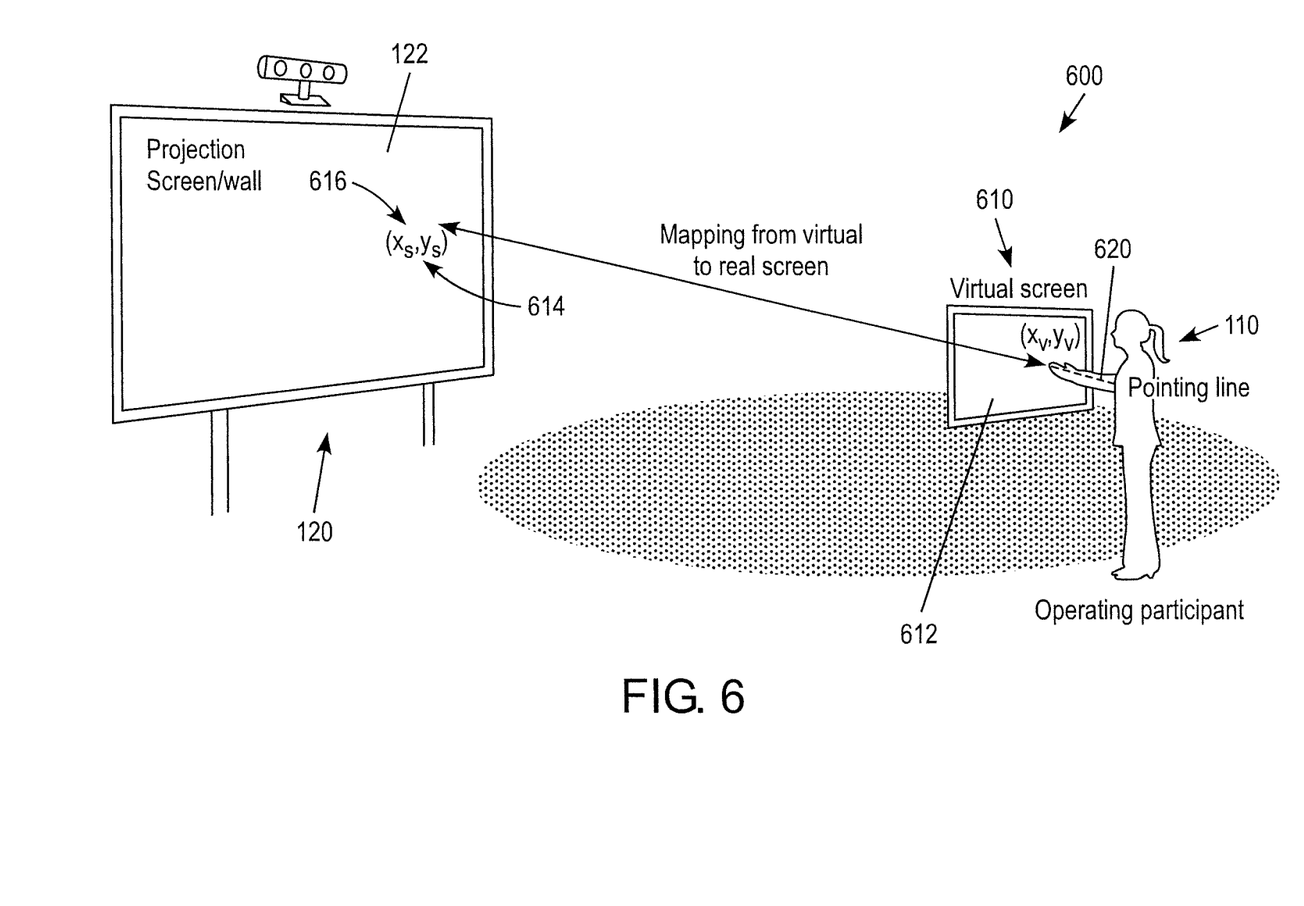
FIG. 6 shows an exemplary example of an estimate of a pointing location on a screen using virtual screen mapping in accordance with an exemplary embodiment.

FIG. 6 shows an estimation of pointing location on the screen 122 using virtual screen mapping 600 in accordance with an exemplary embodiment using the target region mapping and estimation module 240. After detecting the pointing action, an initial estimate of the location in which the user is pointing can be obtain form the skeleton data using the three-dimension (3D) coordinates of the pointing hand (wrist) and the corresponding shoulder. For example, in accordance with an exemplary embodiment, the depth coordinates can be in millimeters (mm). Let, for example, the 3D coordinates of the hand be $(x_h, y_h, z_h)$. The depth offset of the camera with respect to the screen or the virtual screen should first be subtracted from the depth coordinates of the shoulder and hand.

The Euclidean distance of the shoulder point in the previous frame and the current frame can be used as a measure of correctness. In case of self-occlusion, the shoulder point would be inaccurate and would have to be transformed to the location of the previous frame.

A virtual screen 610 of a fixed size can be created centered at the person, parallel to the person and at an arm's length from the person. The pointing line 620 is projected on to the virtual screen 610.

The virtual point 612 is then scaled and repositioned with respect to the actual projection screen or wall 122 to obtain the real coordinates of pointing 614. In accordance with an exemplary embodiment, the real coordinates of pointing 614 can correspond to a target 616.

For starting point and end point of the hand (shoulder and wrist) denoted with subscript s and e, the pointing line can be given as $$X_i = \frac{-Z_e(X_s - X_e)}{Z_s - Z_e} + X_e$$

$$Y_i = \frac{-Z_e(Y_s - Y_e)}{Z_s - Z_e} + Y_e$$

Assuming no variation in orientation, the depth of the sensor with respect to the screen is to be subtracted from the depth coordinates of the skeleton. The logical pixel coordinates can then be computed from the point of intersection.

$$X_p = \frac{X_i \cdot x_{res}}{W}$$

$$Y_p = \frac{Y_i \cdot y_{res}}{H}$$

Here, W and H are the actual height and width of the screen, while $x_{res}$ and $y_{res}$ are the spatial resolution of the screen.

Interaction Module

After computing the initial estimate of location pointed by the user, the interaction module 250 obtains real-time feedback from the user 110 to obtain the accurate location that the user intends to point to.

Based on the initial estimate, a portion of the screen around the initial estimate is highlighted for the user. The user then continues to move his hand. Hand tracking can be performed to obtain the direction of motion of the hand. Based on this motion, the highlighted region on the screen is continuously modified. In every iteration, the highlighted region expands or shrinks or displaces by a fixed factor based on the direction of motion. In accordance with an exemplary embodiment, this can continue until the user 110 either lowers his hand signaling a cancel operation or the region shrinks to a single point, which shows that the required location has been reached.

In accordance with an exemplary embodiment, the interaction module 250 can function as follows:

Given a point c $(x_s, y_s)$ 614 on the actual screen, which is initially estimated by the system on pointing recognition, a circle, centered at c and a pre-set (or defined) radius r is constructed.

$$(x-x_s)^2 + (y-y_s)^2 = r^2$$

If the person continues pointing without significant motion, the circle shrinks at a fixed rate towards the same center.

$$r = \alpha r, \; \alpha < 1$$

If the person moves his hand in a particular direction, the system detects if the person's hand is still within the circle or has gone outside it.

If the person's hand is within the circle, the circle stops shrinking and displaces in the direction d of motion at a rate proportional to speed of motion $v_m$.

$$c = c + \beta \cdot v_m \cdot d$$

If the person's hand is outside the circle, the circle expands at a rate proportional to speed of motion and the center displaces at a rate proportional to speed of motion.

$$c = c + \beta \cdot v_m \cdot d$$

$$r = \gamma \cdot v_m \cdot r, \gamma > 1$$

Advantageously, the system and method as disclosed herein can avoid a jiggling or continuous movement of the point or area, for example, in a situation wherein the user is pointing and the hand wiggles and/or moves.

If the task involves target selection among many targets, an interactive target selection is performed along the same lines as explained below.

Interactive Target Selection

Figure 7:
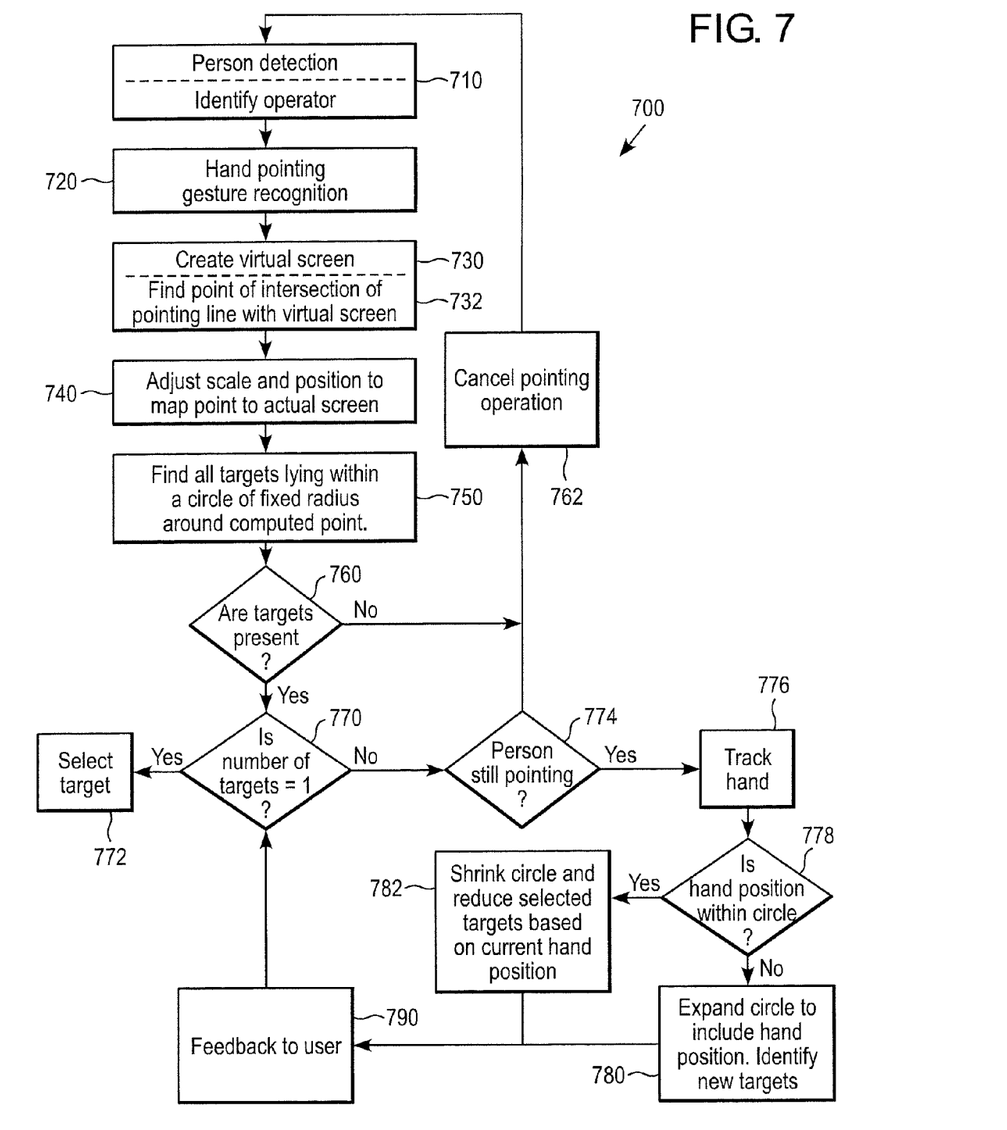
FIG. 7 is a flowchart for interactive target selection in accordance with an exemplary embodiment.

FIG. 7 is a flowchart for interactive target selection 700 in accordance with an exemplary embodiment. In the scenario where a single target is to be selected among a known number of targets on the screen by pointing, interactive target selection is performed using the same system. As shown in FIG. 7, in step 710, the feature extraction module 210 and the operator identification module 220 can detect a speaker and/or user 110, and/or identify the operator.

In step 720, the gesture recognition module 230 identifies a pointing gesture. In steps 730, 732, a virtual screen is created (730), wherein points of intersection of the pointing line with the virtual screen are found (732). In step 740, after an initial set of targets are identified on the screen using the pointing direction and screen mapping. In step 750, all targets lying within a circle of a fixed radius around a computed point can be found and/or identified. In step 760, a determination can be made, if at least one target is present. In step 770, a determination is made if the number of targets is equal to one. If in step 770, the number of target is equal to one, the target is selected. If in step 770, the number of targets is not equal to one, the process continued to step 774. If the number of targets in step 760 is zero, the process continues to step 762, wherein the pointing operation is canceled.

If in step 774, a determination is made that the user 110 is still pointing, in step 776, the algorithm continually tracks the pointing hand and in step 778, a determination can be made if the hand is still within the circle. In step 782, if the hand is not showing significant motion, the circle shrinks continuously at a fixed pace reducing the number of selected targets. If the hand moves within the specified circle, the center of the circle shifts in the direction of motion of the hand. The set of identified targets is updated to exclude those, which have moved out of the circle and include those targets, which are within the circle. Alternatively, in step 780, if the hand position is outside the circle, the circle begins to expand to accommodate the hand and shift in the direction of hand. The targets are updated to include all within the current circle. The expanding and shrinking process continues until only one target is left (step 770) or the person cancels the operation (step 762). As soon as a single target is identified (i.e., the number of targets is equal to one), in step 772, the single target is selected. The process (or algorithm) can utilize the known location of targets on the screen to speed up the pointing process. In step 790, the user's hand movement is an input to the system and the targets identified on the screen can provide feedback to the user.

In accordance with an exemplary embodiment, for example, for other operations such as drawing or writing, the system can use the knowledge of the task to be performed by the user to accelerate the process and increase accuracy of the system. For example, if the person is drawing geometric shapes, the cursor could take the path of the nearest geometric shape which the user is attempting to draw within the highlighted region. If the user is attempting to write in a known script, the system could detect the script and move the cursor intelligently in a way that helps the user to write legibly.

Interactive Target Selection for Real Objects

In accordance with an exemplary embodiment, in the scenario where a single real object 811 is to be selected among a known number of objects 810 by pointing, interactive target selection 800 can be performed using a system as disclosed herein. In this scenario, for example, as shown in FIGS. 8A-8C, a similar process for initial region estimation for pointing in 3D space can be used.

As previously disclosed, the gesture segmentation and recognition module 230 can identify the pointing gesture. An initial set of real objects 810, for example, consumer goods 812, can be identified in the space and the operator (or user) 110 will receive a feedback to understand which objects 810 are in initial estimation. If there is only one object, the object 810 can be selected by pointing towards the object 810.

Figure 8A:
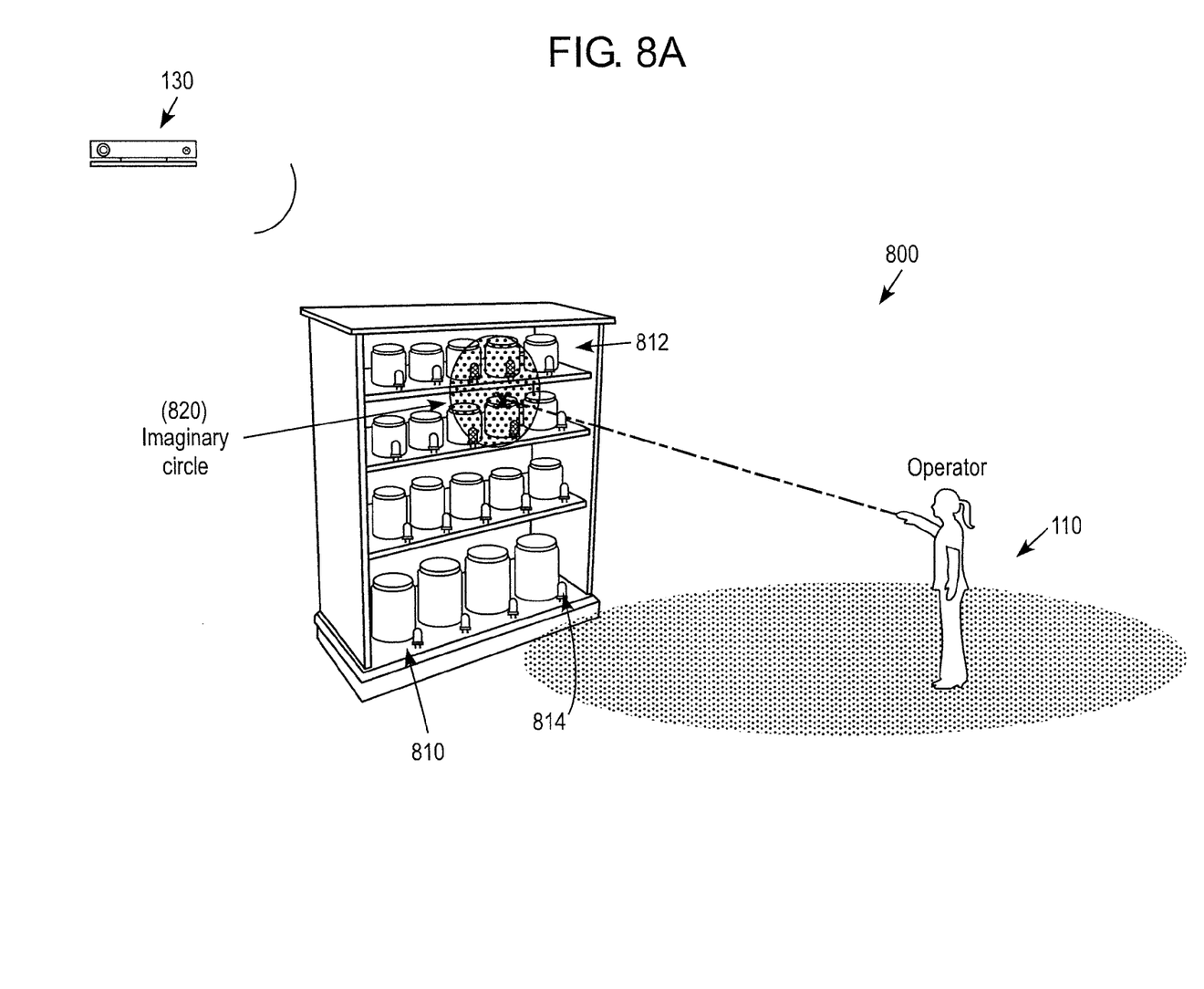
FIGS. 8A-8C show three stages of an interactive target selection with real objects in accordance with an exemplary embodiment.
Figure 8B:
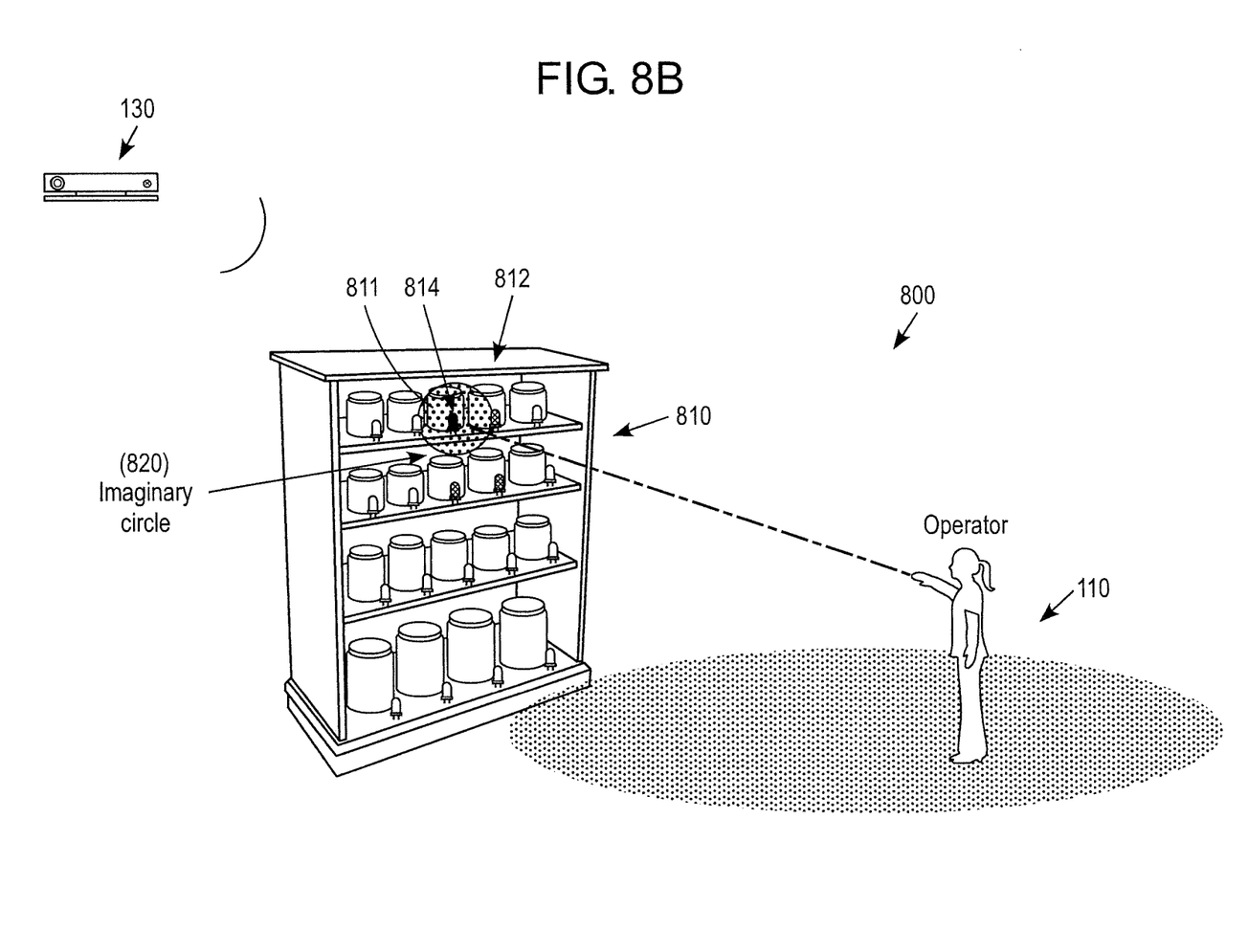
Figure 8C:
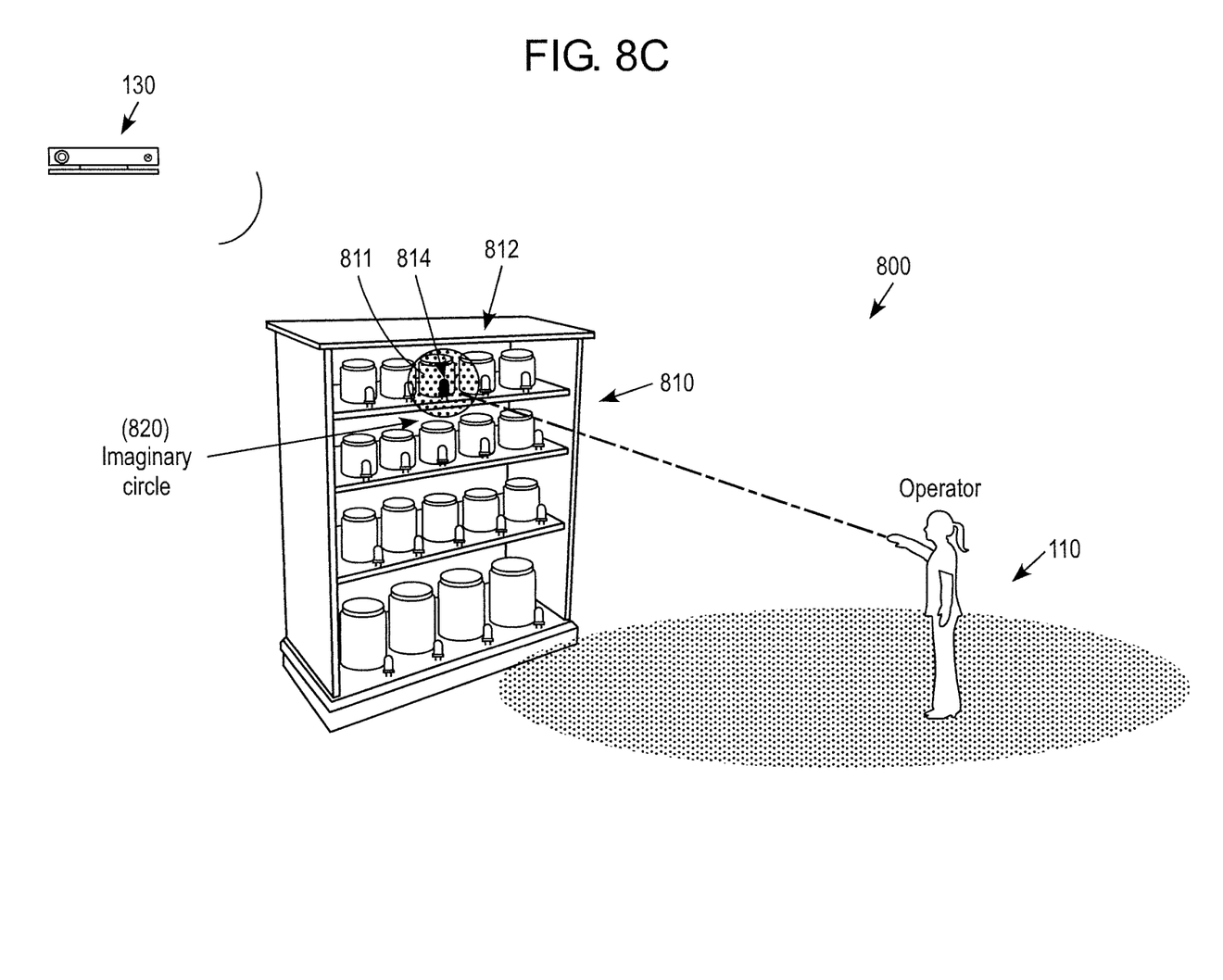

In the case of multiple close objects 810, for example, as shown in FIG. 8A, the initial estimation is the set of objects 810 within an imaginary circle 820 with the center at the initial estimated point. Each object has an indicator 814, which shows whether it is a candidate for selection. For example, as shown in FIG. 8A, indicators 814 on candidate objects 810 inside the initially estimated circle can be selected by their indicators turning, for example, red, and wherein the pointing action of the system provides the operator 110 an initial estimation based on the operator's pointing action.

The process (or algorithm) can continually track the pointing hand, and modifies the set of selected objects 810. For example, if the hand of the operator 110 is not showing significant motion, the number of potential objects continuously decreases at a fixed pace. If the hand moves within the specified circle, the center of the circle shifts in the direction of motion of the hand. If the hand position is outside the circle, the circle begins to expand to accommodate the hand and shift in the direction of hand. In accordance with an exemplary embodiment, for example, the object indicators 814 can be updated to include all of the objects 810 within the current circle and exclude those objects, which are not. The expanding and shrinking process continues as shown in FIGS. 8B and 8C until only one target (or object) is left or the person cancels the operation. As soon as a single object 811 (FIG. 8C) is identified, the object 811 is selected and the indicator gives the operator (or user) 110 feedback about his final selection.

FIG. 8B shows an example where the imaginary circle 820 shrinks based on the hand movement. In accordance with an exemplary embodiment, for example, if the operator 110 moves his or her hand slightly inside the imaginary circle 820, the imaginary circle will shrink and the system continuously tracks the hand movement of the operator 110. The indicator 814 can turn, for example, green to give feedback to the operator 110 based on the detection of the system and the operator's pointing action.

As shown in FIG. 8C, for example, if the operator 110 keeps pointing at a single object 811 after the indicator 814 has, for example, change colors, for example, to green, the system will determine that the operator 110 is satisfied with the selection of the object 811. At this time, the other indicators 812 can be turned off and the indicator, for the selected object 811 can remain for example, green.

In accordance with an exemplary embodiment, for example, shopping in a mainstream supermarket with a large number of shelves and products can be performed as set forth above. Each product can have an LED as a selection indicator. When a customer points to a location, LEDs within the imaginary circle with the center at initial pointing estimation can be turned on. The customer's hand can be tracked to update the selected objects. As soon as a single product is identified, all LEDs except the selected product (or consumer good) will be turned off and the final selection is shown to the customer. Indicator system is not limited in using LEDs for each location of products.

In accordance with an exemplary embodiment, a non-transitory computer readable medium containing a computer program storing computer readable code for recognizing gestures for real-time interaction with a user interface is disclosed, the program being executable by a computer to cause the computer to perform a process comprising: capturing three-dimensional (3D) data on a subject; detecting a pointing action by the subject from the 3D data; computing an initial estimate of a target region from the pointing action, the initial estimate of the target region having a defined radius around a center point; and tracking the pointing action of the subject and performing a series of iterations wherein the defined radius of the target region changes based on the detected pointing action.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of recognizing gestures for real-time interaction, comprising:
   capturing three-dimensional (3D) data on a subject;
   detecting a pointing action by the subject from the 3D data;
   computing an initial estimate of a target region from the pointing action, the initial estimate of the target region having a defined radius around a center point;
   tracking the pointing action of the subject and performing a series of iterations wherein the defined radius of the target region changes based on the detected pointing action; and
   providing feedback to the subject by highlighting a portion around the initial estimate and continuously modifying the highlighted portion until the highlighted portion shrinks to a single point indicating that a desired location has been reached.

2. The method of claim 1, comprising:
   reducing the defined radius of the target region if the pointing action is within the defined radius; and
   expanding the defined radius if the pointing action by the subject is outside the defined radius.

3. The method of claim 1, comprising:
   shifting the center point of the defined radius upon detecting a movement of the pointing action of the user is within the defined radius and a detection of a change in the pointing action relative to the center point of the defined radius.

4. The method of claim 1, comprising:
   reducing and expanding the defined radius at a fixed rate at a rate proportional to speed of motion of the pointing action of the subject.

5. The method of claim 1, comprising:
   selecting a target within the target region, the selection of the target comprising:
      determining if one or more targets are within the defined radius; and
      if at least one target is present, determining if a number of targets is equal to one or greater than one, and wherein if the number of targets is equal to one, selecting a target, and if the number of targets is greater than one, reducing the defined radius to reduce the number of targets within the defined radius until a single target remains.

6. A system for recognizing gestures for real-time interaction, comprising:
   a motion and depth sensor configured to capture three-dimensional (3D) data on a subject; and
   a processor configured to:
      capture three-dimensional (3D) data on a subject;
      detect a pointing action by the subject from the 3D data;
      compute an initial estimate of a target region from the pointing action, the initial estimate of the target region having a defined radius around a center point;
      track the pointing action of the subject and performing a series of iterations wherein the defined radius of the target region changes based on the detected pointing action; and
      provide feedback to the subject by highlighting a portion around the initial estimate and continuously modifying the highlighted portion until the highlighted portion shrinks to a single point indicating that a desired location has been reached.

7. The system of claim 6, wherein the processor is configured to:
   reduce the defined radius of the target region if the pointing action is within the defined radius; and
   expand the defined radius if the pointing action by the subject is outside the defined radius.

8. The system of claim 6, wherein the processor is configured to:
   shift the center point of the defined radius upon detecting a movement of the pointing action of the user is within the defined radius and a detection of a change in the pointing action relative to the center point of the defined radius.

9. The system of claim 6, wherein the processor is configured to:
reduce and expand the defined radius at a fixed rate at a rate proportional to speed of motion of the pointing action of the subject.

10. The system of claim 6, wherein the processor is configured to:
select the target within the target region, the selection of the target comprising:
determining if one or more targets are within the defined radius; and
if at least one target is present, determining if a number of targets is equal to one or greater than one, and wherein if the number of targets is equal to one, selecting a target, and if the number of targets is greater than one, reducing the defined radius to reduce the number of targets within the defined radius until a single target remains.

11. A non-transitory computer readable medium containing a computer program storing computer readable code for recognizing gestures for real-time interaction, the program being executable by a computer to cause the computer to perform a process comprising:
capturing three-dimensional (3D) data on a subject;
detecting a pointing action by the subject from the 3D data;
computing an initial estimate of a target region from the pointing action, the initial estimate of the target region having a defined radius around a center point;
tracking the pointing action of the subject and performing a series of iterations wherein the defined radius of the target region changes based on the detected pointing action; and
providing feedback to the subject by highlighting a portion around the initial estimate and continuously modifying the highlighted portion until the highlighted portion shrinks to a single point indicating that a desired location has been reached.

12. The computer readable storage medium of claim 11, comprising:
reducing the defined radius of the target region if the pointing action is within the defined radius; and
expanding the defined radius if the pointing action by the subject is outside the defined radius.

13. The computer readable storage medium of claim 11, comprising:
shifting the center point of the defined radius upon detecting a movement of the pointing action of the user is within the defined radius and a detection of a change in the pointing action relative to the center point of the defined radius.

14. The computer readable storage medium of claim 11, comprising:
reducing and expanding the defined radius at a fixed rate at a rate proportional to speed of motion of the pointing action of the subject.

15. The computer readable storage medium of claim 11, comprising:
selecting a target within the target region, the selection of the target comprising:
determining if one or more targets are within the defined radius; and
if at least one target is present, determining if a number of targets is equal to one or greater than one, and wherein if the number of targets is equal to one, selecting a target, and if the number of targets is greater than one, reducing the defined radius to reduce the number of targets within the defined radius until a single target remains.

16. A method of recognizing gestures for real-time interaction, comprising:
capturing three-dimensional (3D) data on a subject;
detecting a pointing action by the subject from the 3D data to begin a pointing operation;
determining a point of intersection of the pointing action on an actual screen;
determining if one or more targets on the actual screen are within a defined radius around a computed point on the actual screen;
if at least one target is present, determining if a number of targets is equal to one or greater than one, and wherein if the number of targets is equal to one, selecting a target, and if the number of targets is greater than one, reducing the defined radius to reduce the number of targets within the defined radius until a single target remains; and
providing feedback to the subject by highlighting a portion of the actual screen around the initial estimate and continuously modifying the highlighted portion until the highlighted portion shrinks to a single point indicating that a desired location has been reached.

17. The method of claim 16, comprising:
if the point of intersection of the pointing action by the subject on the virtual screen changes, shifting a center of the defined radius; and
updating the number of targets within the defined radius by excluding targets outside the defined radius and including targets which are within the defined radius.

18. The method of claim 16, comprising:
expanding the defined radius if the pointing action by the subject is outside the defined radius;
updating the number of targets within the defined radius to include targets within the expanded defined radius; and
reducing the expanded defined radius and expanding the defined radius until only one target is identified within the defined radius.

19. The method of claim 16, comprising:
capturing the 3D data with a motion and depth sensor; and
wherein the actual screen is a projection screen or video screen.

20. The method of claim 19, wherein the actual screen is a plurality of selection indicators, each of the plurality of selection indicators corresponding to a consumer good.

21. The method of claim 1, wherein the continuous modifying of the highlighted portion until the highlighted portion shrinks to the single point indicating that the desired location has been reached further comprises:
expanding or shrinking the highlighted region by a fixed factor based on the detected pointing action of the subject; and
canceling the feedback to the subject upon a lowering of the subject's hand.

22. The system of claim 6, wherein the continuous modifying of the highlighted portion until the highlighted portion shrinks to the single point indicating that the desired location has been reached further comprises:
expanding or shrinking the highlighted region by a fixed factor based on the detected pointing action of the subject; and canceling the feedback to the subject upon a lowering of the subject's hand.

23. The computer readable storage medium of claim 11, wherein the continuous modifying of the highlighted portion until the highlighted portion shrinks to the single point indicating that the desired location has been reached further comprises:
  expanding or shrinking the highlighted region by a fixed factor based on the detected pointing action of the subject; and
  canceling the feedback to the subject upon a lowering of the subject's hand.

\* \* \* \* \*